E. P. JOHNSON.
MECHANICAL MOVEMENT.
APPLICATION FILED MAR. 13, 1918.
1,349,724.
Patented Aug. 17, 1920.
2 SHEETS—SHEET 1.
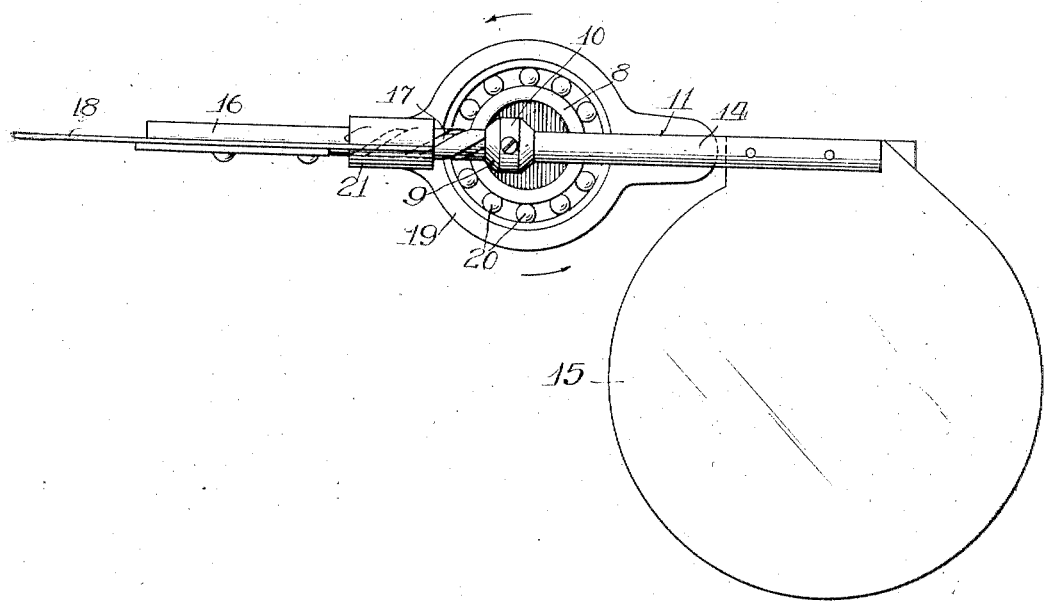
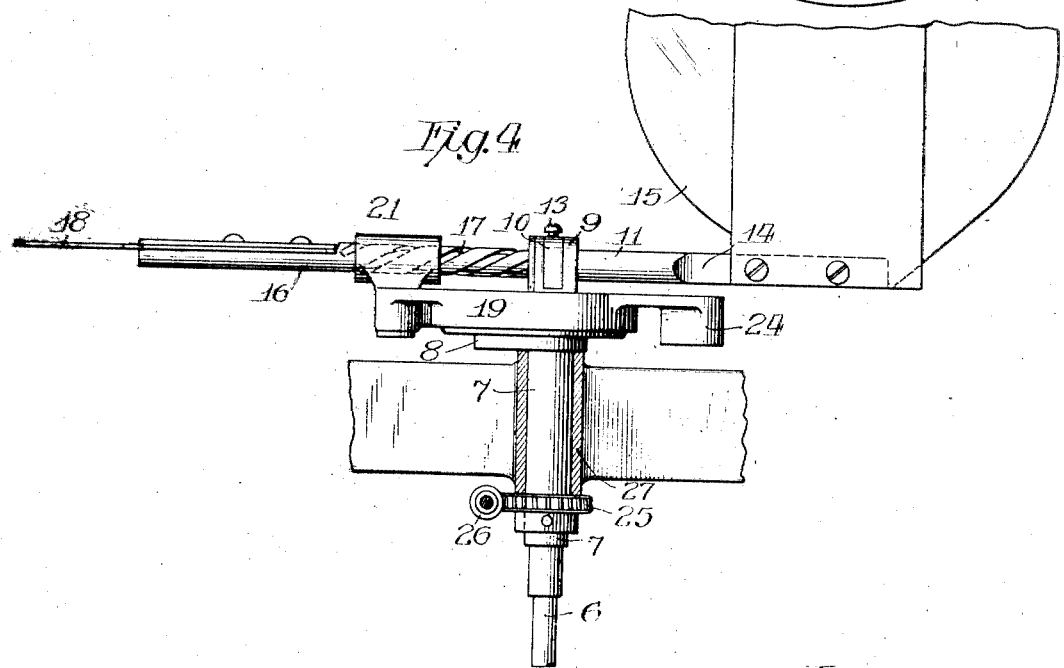
Inventor
Edward P. Johnson.
By: Wm P. Bond Atty

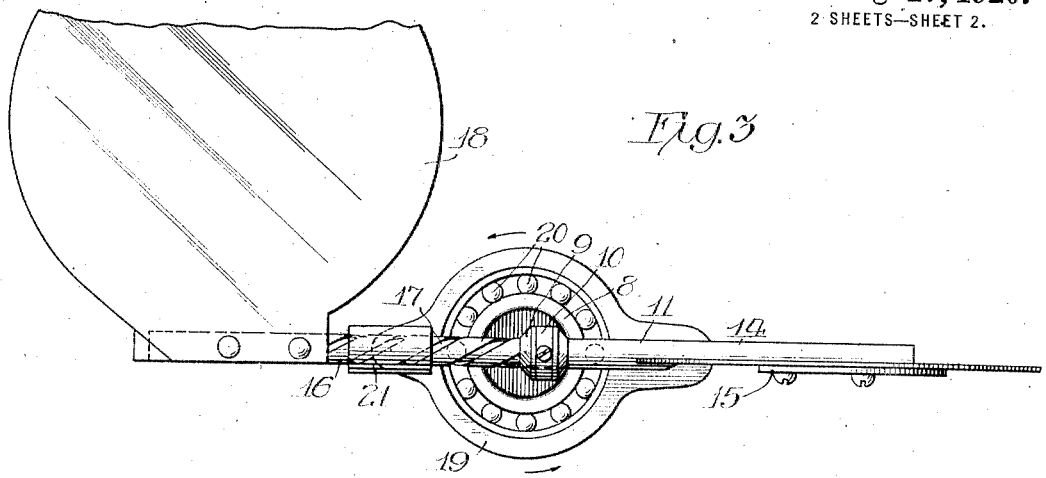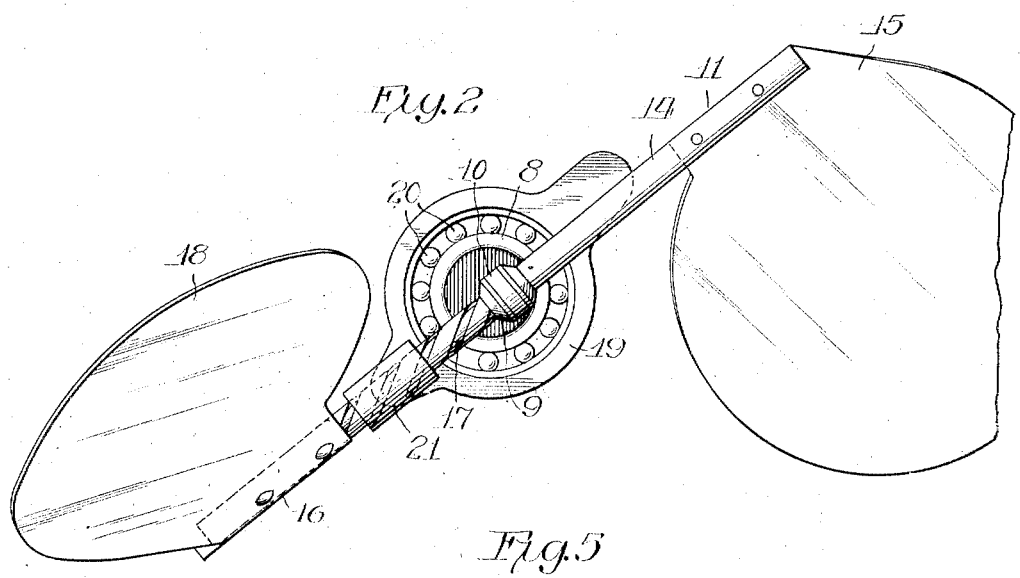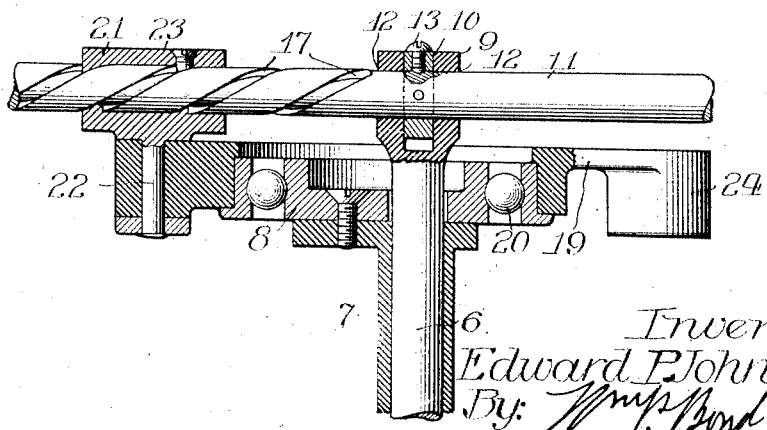

UNITED STATES PATENT OFFICE.

EDWARD P. JOHNSON, OF CHICAGO, ILLINOIS.

MECHANICAL MOVEMENT.

1,349,724.  Specification of Letters Patent.  Patented Aug. 17, 1920.

Application filed March 13, 1918. Serial No. 222,079.

*To all whom it may concern:*

Be it known that I, EDWARD P. JOHNSON, a citizen of the United States, residing at Chicago, in the county of Cook and State of Illinois, have invented certain new and useful Improvements in Mechanical Movements, of which the following is a specification.

The present invention relates to a mechanical movement for imparting a rocking movement to a driven shaft from a continued rotary movement of the driving shaft.

The objects of the invention are, to provide means mounted eccentrically with respect to the drive shaft, and in which the drive shaft has a turning fit; to provide a driven shaft extending crosswise of the drive shaft, and having a rotatable driving connection therewith; and to further provide a connection between the eccentrically mounted means and the driven shaft, whereby a rocking movement is imparted to the driven shaft as it is swung about the axis of the drive shaft by the rotation of the latter.

A further object of the invention is to provide a simple means for effecting a reversal of the movement of the driven shaft.

A further object of the invention is to mount paddle or wing members upon the driven shaft, which will be given a back and forth vibratory movement by the rocking movement of the driven shaft, and the movement so given to the wing members being one that produces a small amount of frictional resistance during the operation of the device.

The invention further consists in the features of construction and combination of parts hereinafter described and claimed.

In the drawings:

Figure 1 is a face view of the mechanism of the present invention;

Fig. 2 is a view similar to Fig. 1, and showing the position of the parts after the drive shaft has been given one-half a revolution;

Fig. 3 is a view similar to Fig. 1, and showing the position of the parts when the drive shaft has been moved into position to reverse the direction of movement of the driven shaft;

Fig. 4 is a side view, partially in section, of the mechanism of the present invention; and Fig. 5 is a sectional detail, on an enlarged scale, of the device.

Referring now to the drawings, the mechanism comprises a drive shaft 6, operated from any suitable source of power. The drive shaft extends through a sleeve 7 and has a turning fit therein. The sleeve is connected to a hub 8, which is mounted loosely upon the drive shaft and eccentrically with respect thereto. The drive shaft extends beyond the hub and terminates in a bifurcated end 9, lying between the forks of which is a collar 10. The driven shaft 11 extends crosswise of the drive shaft and has its axis of rotation arranged at approximate right angles to the axis of rotation of the drive shaft. The driven shaft extends through openings 12 in the forked end of the drive shaft and has a turning fit in said openings.

The collar 10 is secured to the driven shaft by means of a set-screw 13, or otherwise. The collar 10, however, is free to revolve within the space between the forks 9, and there is thus effected a rotatable driving connection between the drive and driven shafts. One end 14 of the driven shaft is of a smooth character and has attached thereto a wing member 15. The other end 16 of the driven shaft is formed with a spiral thread 17; and connected to this end 16 is a wing member 18.

Mounted concentrically with respect to the hub 8 is a ring 19, and, as shown in the drawings, interposed between the hub and ring are a series of anti-friction members 20. The ring has a sleeve 21 pivotally attached thereto by means of a pin 22, and this ring carries a stud 23, which engages with the spiral thread 17 on the driven shaft. A counterweight 24 is, as shown, placed upon the ring 19 for the purpose of balancing the ring, owing to the presence thereon of the sleeve 21.

Referring now to Figs. 1 and 2, assume that the shaft 6 is being rotated in the direction of the arrows. It will bodily swing the driven shaft 11 in such direction and about the center of rotation of the drive shaft. The connection between the driven shaft and the ring 19, namely, the sleeve 21, will cause this ring to revolve simultaneously with the swinging of the driven shaft. The ring, however, is mounted eccentrically with respect to the drive shaft, and since the driven shaft is swinging about the center of the drive shaft, the point of attachment of the sleeve 21 to the ring 19 will approach and recede from the center of the drive shaft 6 as said drive shaft is rotated; and said sleeve will be given a back and forth movement longitudinally of the driven shaft, owing to said shaft moving about the center of the drive shaft while the sleeve is moving eccentrically thereto.

This movement of the sleeve longitudinally of the driven shaft will cause the stud 23 carried by said sleeve to travel within the spiral grooves of the driven shaft 11. Such movement will impart to the driven shaft a rocking movement back and forth during its swing of travel about the center of the drive shaft. This will cause vibratory movements to be imparted to the blades 15 and 18, one of them moving in one direction while the other is moving in the opposite direction. In order to produce a propeller movement to enable the invention to be used on ships, aeroplanes, etc., one of the said mechanisms is arranged at each end of a shaft so that when applied they are positioned after the manner of a paddle wheel, either with one appliance on each side of the craft or one at each end thereof. When positioned at the end they turn in a plane parallel to the longitudinal dimension of the craft instead of in a plane crosswise of the longitudinal dimension of the craft as is the case in the use of the well known screw propeller. The invention is not deemed to be limited to application to ships, aeroplanes, or the like, but is claimed in whatever fields of work it may be adapted for. When the appliance is arranged for use as a propeller, one of the blades on the mechanism at each end of the shaft will be acting to compress the air or water and the remaining blades will be turned so as to cut through the air or water with a noncompressing movement. The blades are of a thin, flat character and consequently move into and out of position wherein they engage or disengage from the air, water, or other body, with a sharp cutting movement. This eliminates the friction produced by any wide extended surface of the wings, counteracting the driving force thereof and lessening the efficiency.

It is deemed desirable to provide means for reversing the direction of rocking movement of the driven shaft 11. In the present invention, this is quickly and easily accomplished by the following means:

The sleeve 7 has attached thereto a spiral pinion 25 meshing with a spiral gear 26, which is operated by hand, or otherwise, in any suitable manner. The sleeve 6 is mounted within a fixed bearing 27, and by rotating this sleeve, the hub 8 is rotated about its center of movement, and this center being eccentric to the drive shaft 6, the drive shaft will be bodily moved from one side of the center of rotation of said hub to the opposite side. This draws the driven shaft 11 from the position shown in Fig. 1 to the position shown in Fig. 3. Such a movement, owing to the presence of the connection between the sleeve and the spirally threaded end 16 of the driven shaft, rotates said driven shaft and moves the blade 15 from the position shown in Fig. 1 to that in Fig. 3, and the blade 18 from the position shown in Fig. 1 to that shown in Fig. 3, so that at the start of movement of the drive shaft, these blades are assuming opposite positions from that which they previously occupied, and hence the blade 15 is rising in exactly reverse timing to which it rose with the parts as in Fig. 1. Referring now to Figs. 1 and 3, it will be explained how the above would cause a reversal of movement of the craft when the invention is used for propelling purposes. In Fig. 1, the blades 18 are arranged so that they compress in a manner to move the craft forward; but when the parts are shifted to the position of Fig. 3, the blades 15 are then exerting the compressing action, and hence there will by a reversal of movement of the propelled craft.

I claim:

1. In a device of the character set forth, the combination of a driving shaft, an eccentric through which the shaft passes, means for rotatably adjusting the eccentric, a ring around said eccentric, a bearing pivotally mounted at one side of the ring, a counterweight at the opposite side of the ring, a transverse bearing at the end of the driving shaft, a driven shaft rotatably mounted in said bearing, means for holding the driven shaft against longitudinal movement, said driven shaft passing through the bearing on said eccentric, threads on said driven shaft, and threads in the bearing engaging with the threads on said shaft.

2. In a mechanical movement, the combination of a main shaft, an eccentric through which the shaft passes, a ring around said eccentric, a threaded bearing pivotally mounted on the ring, a transverse bearing in said main shaft, a shaft rotatably mounted in said transverse bearing, and means for holding the last named shaft against longitudinal movement, said last named shaft having threads engaging with said threaded bearing.

3. In a device of the character set forth, the combination of a bearing, a sleeve rotatably mounted in said bearing, a driving shaft mounted in said sleeve and having a transverse bearing, an eccentric carried by said sleeve, a driven shaft, a threaded bearing carried by said eccentric and engaging with a correspondingly threaded portion of the driven shaft, and wings secured to the ends of said driven shaft, the wings extending entirely to one side of the shaft, whereby they may be more readily rotated.

4. In a device of the character set forth, the combination of a driving shaft, an eccentric upon said shaft, means for rotatably adjusting the eccentric, a ring around said eccentric, a bearing pivotally mounted at one side of said ring, a counterweight at the opposite side of said ring, a transverse bearing at the end of the driving shaft, a driven shaft rotatably mounted in said transverse bearing but held from longitudinal movement therein, said driven shaft passing through the bearing on said eccentric, threads on said driven shaft, means on the last-named bearing for engaging with said threads, and wings secured to the ends of the driven shaft at substantially right angles to each other, each of said wings being attached at one side only to the driven shaft.

EDWARD P. JOHNSON.